US008914166B2

(12) United States Patent  
He

(10) Patent No.: US 8,914,166 B2  
(45) Date of Patent: Dec. 16, 2014

(54) ENHANCED FLIGHT VISION SYSTEM FOR ENHANCING APPROACH RUNWAY SIGNATURES

(75) Inventor: Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 289 days.

(21) Appl. No.: 12/849,696

(22) Filed: Aug. 3, 2010

(65) Prior Publication Data

US 2012/0035789 A1 Feb. 9, 2012

(51) Int. Cl.
*G01C 23/00* (2006.01)

(52) U.S. Cl.
CPC .................................... *G01C 23/005* (2013.01)
USPC ........................................................ 701/16

(58) Field of Classification Search
USPC .......................................................... 701/16
See application file for complete search history.

(56) References Cited

U.S. PATENT DOCUMENTS

| 4,999,780 | A | * | 3/1991 | Mitchell | 701/16 |
|---|---|---|---|---|---|
| 6,061,068 | A | | 5/2000 | Hoffman, II et al. | |
| 6,157,876 | A | | 12/2000 | Tarleton, Jr. et al. | |
| 6,219,594 | B1 | * | 4/2001 | Nicosia et al. | 701/16 |
| 6,591,171 | B1 | * | 7/2003 | Ammar et al. | 701/16 |
| 6,952,632 | B2 | | 10/2005 | Robert et al. | |
| 7,089,092 | B1 | * | 8/2006 | Wood et al. | 701/14 |
| 7,196,329 | B1 | | 3/2007 | Wood et al. | |
| 7,295,901 | B1 | * | 11/2007 | Little et al. | 701/16 |
| 7,605,719 | B1 | * | 10/2009 | Wenger et al. | 340/974 |
| 7,605,774 | B1 | | 10/2009 | Brandt et al. | |
| 7,715,978 | B1 | * | 5/2010 | Wenger et al. | 701/448 |
| 7,719,483 | B2 | | 5/2010 | Feyereisen et al. | |
| 7,852,236 | B2 | * | 12/2010 | Feyereisen et al. | 340/971 |
| 2003/0132860 | A1 | * | 7/2003 | Feyereisen et al. | 340/973 |
| 2006/0049333 | A1 | | 3/2006 | Rols et al. | |
| 2006/0066459 | A1 | | 3/2006 | Burch et al. | |
| 2007/0241936 | A1 | | 10/2007 | Arthur et al. | |
| 2008/0180351 | A1 | | 7/2008 | He | |
| 2008/0218434 | A1 | * | 9/2008 | Kelly et al. | 345/8 |
| 2008/0240498 | A1 | | 10/2008 | Hamza | |
| 2009/0040070 | A1 | * | 2/2009 | Alter et al. | 340/945 |
| 2009/0207048 | A1 | * | 8/2009 | He et al. | 340/973 |
| 2009/0214080 | A1 | | 8/2009 | Hamza et al. | |

(Continued)

FOREIGN PATENT DOCUMENTS

EP 2154665 A2 2/2010

OTHER PUBLICATIONS

EP Search Report for EP application No. EP 11 175 442.0 dated Feb. 24, 2014.

(Continued)

*Primary Examiner* — Khoi Tran
*Assistant Examiner* — Adam Mott
(74) *Attorney, Agent, or Firm* — Ingrassia Fisher & Lorenz, P.C.

(57) ABSTRACT

Methods and apparatus are provided for visually enhancing approach runway signatures on en Enhanced Flight Vision System (EFVS). The EFVS may retrieve a location and an approach course for a runway, display, on the EFVS, a representation of the runway and the approach course for the runway relative to a position of the aircraft, define an area, along the approach course and before a first end of the runway, where the approach runway signature should be located, and visually enhance, on the EFVS, the defined area.

16 Claims, 6 Drawing Sheets

(56) References Cited

U.S. PATENT DOCUMENTS

| | | |
|---|---|---|
| 2009/0303082 A1 | 12/2009 | Larson et al. |
| 2010/0026525 A1 | 2/2010 | Feyereisen et al. |
| 2010/0039294 A1 | 2/2010 | Feyereisen et al. |
| 2010/0082187 A1* | 4/2010 | Nichols et al. ............ 701/16 |
| 2010/0113149 A1* | 5/2010 | Suddreth et al. .......... 463/31 |
| 2010/0321488 A1* | 12/2010 | Soler ........................ 348/115 |

OTHER PUBLICATIONS

EP Examination Report for EP application No. EP 11 175 442.0 dated Mar. 10, 2014.

* cited by examiner

ENHANCED FLIGHT VISION SYSTEM FOR ENHANCING APPROACH RUNWAY SIGNATURES

FIELD OF THE INVENTION

The present invention generally relates to aircraft navigation and more particularly relates to assisting a pilot in identifying approach runway signatures during landings in adverse weather conditions.

BACKGROUND OF THE INVENTION

Before a pilot can land an aircraft, the pilot is required to visually identify certain features of a runway through the cockpit window. Many airports, for example, have an approach runway signature before each runway, such as a series of lights forming a "T" or a cross pattern (e.g., "†"), to assist pilots in locating the runway. When a pilot is landing an aircraft, federal regulations provide that a pilot must be able to identify, visually through the cockpit window, the approach runway signature or another specific feature before the aircraft may descend below a certain altitude relative to the runway.

There are three types of instrument landing systems (ILS) for aiding a pilot in landing an aircraft, the implementation of which may vary depending upon the aircraft and the airport. For example, a Category I (CAT I) ILS, is a precision instrument approach and landing with a decision height not lower than 200 feet. A Category II (CAT II) ILS is a precision instrument approach and landing with a decision height lower than 200 feet (61 m) above a touchdown zone elevation but not lower than 100 feet. In other words, the pilot must make a decision before the aircraft's altitude is within 200 or 100 feet, respectively, of the touchdown zone whether to proceed with the landing. There are also three types of Category III (CAT III) ILS's with varying decision height levels below 100 feet.

The pilot's decision to proceed with or abort the landing in CAT I, CAT II and CAT III landing situations depend upon whether the pilot can identify approach runway signatures, however, cloud cover and weather conditions can make the identification difficult. Operating at night in the various conditions adds another degree of difficulty to identifying approach runway signatures.

Accordingly, it is desirable to have a system, method and apparatus for assisting the pilot to quickly locate and identify runway approach signatures in all weather and visibility conditions. Other desirable features and characteristics of the present invention will become apparent from the subsequent detailed description of the invention and the appended claims, taken in conjunction with the accompanying drawings and this background of the invention.

BRIEF SUMMARY OF THE INVENTION

An Enhanced Flight Vision System (EFVS) for an aircraft is provided. The EFVS may include a database storing a location of a runway and an approach course for the runway, a display displaying the approach course for the runway and a representation of the runway relative to a current position of the aircraft, a processor configured to define an area, along the approach course and before a first end of the runway, where an approach runway signature should be located, and an imaging device to capture at least one image including the defined area. The processor may be further configured to perform image processing on the at least one captured image including, enhancing the defined area within the at least one captured image, and display the at least one captured image with the enhanced defined area on the display.

A method is provided for visually enhancing approach runway signatures on an enhanced flight vision system on an aircraft. The method may include retrieving a location and an approach course for a runway, displaying, on the enhanced flight vision system, a representation of the runway and the approach course for the runway relative to a position of the aircraft, defining an area, along the approach course and before a first end of the runway, where the approach runway signature should be located, and visually enhancing, on the enhanced flight vision system, the defined area.

BRIEF DESCRIPTION OF THE DRAWINGS

The present invention will hereinafter be described in conjunction with the following figures.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
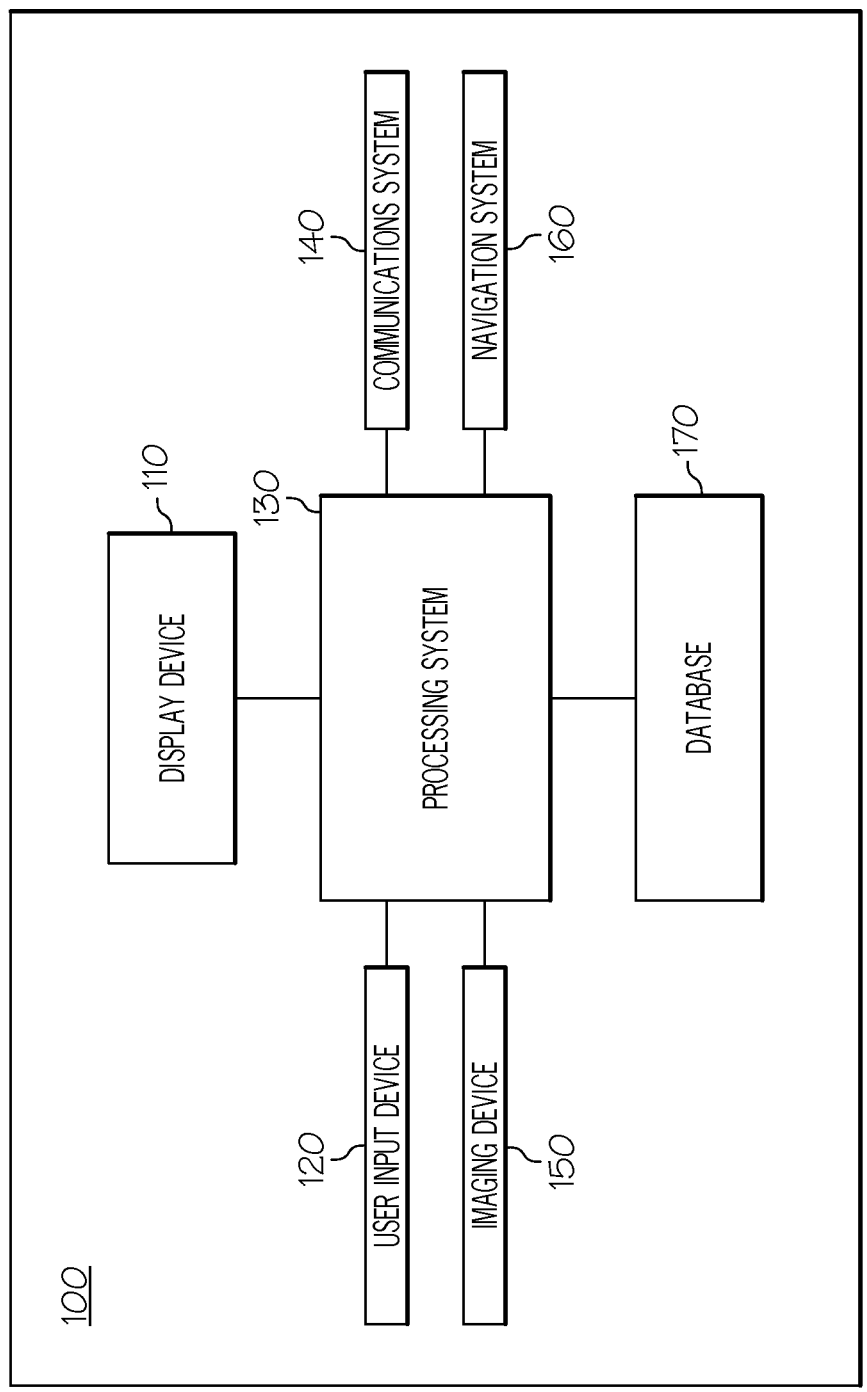
FIG. 1 illustrates an exemplary enhanced flight vision system ("EFVS"), in accordance with an embodiment.

FIG. 1 illustrates an exemplary embodiment Enhanced Flight Vision System 100 ("EFVS") for an aircraft. The EFVS 100 may include a display device 110, a user input device 120, a processing system 130, a communications system 140, an imaging device 150, a navigation system 160 and a database 170. In an exemplary embodiment, the elements of the EFVS 100 are suitably configured to display, render, or otherwise convey additional information on a primary flight display on the display device 110, as described in greater detail below.

The display device 110 is realized as an electronic display configured to graphically display flight information or other data associated with operation of the aircraft or moving platforms. The display device 110 for the EFVS may be implemented on a primary or secondary display in the aircraft. For example, in one embodiment, display device 110 may be a head-up display ("HUD"), a transparent display that presents data without requiring the user to look away from his or her usual viewpoint. In another embodiment, the display device 110 may be a LCD, plasma, OLED, CRT, projection or other type of video screen present in the cockpit. In another embodiment, the display device 110 may be a display system that projects images directly into eye (retina) or project images onto a screen near the eye such as a helmet mounted, eye glass, or near to the eye display devices. The display device 110 is coupled to the processing system 130, which is coupled to the imaging device 150, which are cooperatively configured to display, render, or otherwise convey one or more graphical representations or images associated with operation of the aircraft on the display device 110, as described in greater detail below.

The processing system 130 generally represents the hardware, software, and/or firmware components configured to facilitate communications and/or interaction between the display device 110 and the other elements of the EFVS 100 and perform additional tasks and/or functions to support the EFVS 100, as described in greater detail below. Depending on the embodiment, the processing system 130 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 130 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 130 includes processing logic that may be configured to carry out the functions, techniques, and processing tasks associated with the operation of the EFVS 100, as described in greater detail below. Furthermore, the steps of a method or algorithm described in connection with the embodiments disclosed herein may be embodied directly in hardware, in firmware, in a software module executed by the processing system 130, or in any practical combination thereof. Although FIG. 1 depicts processing system 130 as a distinct and separate element of the EFVS 100, in practice, the processing system 130 may be integrated with another element of the EFVS 100.

In one embodiment, the imaging device 150 may be an infrared ("IR") camera, or the like, mounted to the aircraft configured to take video or still images. The IR camera forms an image from infrared radiation similar to how an optical camera forms an image using visible light. In another embodiment, the imaging device 150 may be a radar based video camera system. Radar based systems emit pulses of electromagnetic radiation and listen for echoes. Based upon the received echoes, the radar system may generate an image or video. In another embodiment, the imaging device 150 may be a sonar based systems. In one embodiment, the imaging device 150 may be mounted in or near the nose of the aircraft and calibrated to align the imaging region with a particular location within a viewing region of a primary flight display rendered on the display device 110. For example, the imaging device 150 may be configured so that the geometric center of its imaging region is aligned with or otherwise corresponds to the geometric center of the viewing region for display device 110. In this regard, the imaging device 150 may be oriented or otherwise directed substantially parallel to an anticipated line-of-sight for a pilot and/or crew member in the cockpit of the aircraft to effectively capture a forward looking cockpit view of the imaging region. In one embodiment, the imaging device 150 generates a synthetic perspective view of terrain in front of the aircraft which can be displayed on display device 110. The synthetic perspective view may show mountains, buildings, obstacles or other terrain features which the pilot may not be able to see through the cockpit window due to various light and weather conditions. The synthetic perspective view is generated to match the direct out window view, based on the current position, attitude, and pointing information from aircraft navigational and flight management systems.

Because the enhanced vision imaging devices uses methods other than visible light to generate images, the display device 110 can display objects, such as mountains, buildings, or ground objects, that a pilot might not otherwise see due to poor visibility conditions. In some instances, certain visible image cameras much more sensitive to the very low level lights not visible to eye can be used to generate images for night operations.

The user input device 120 is coupled to the processing system 130, and the user input device 120 and the processing system 130 are cooperatively configured to allow a user (e.g., a pilot, co-pilot, or crew member) to interact with the display device 110 and/or other elements of the EFVS 100 in a conventional manner. Depending on the embodiment, the user input device 120 may be realized as a keypad, touchpad, keyboard, mouse, touch panel (or touch screen), joystick, knob, line select key or another suitable device adapted to receive input from a user. In some embodiments, the user input device 120 is realized as an audio input device, such as a microphone, audio transducer, audio sensor, or the like, that is adapted to allow a user to provide audio input to the EFVS 100 in a "hands free" manner without requiring the user to move his or her hands and/or head to interact with the display device 110.

When an aircraft is approaching a runway, the processing system 130 may access the database 170 and retrieve the location of the runway, including, but not limited to, the latitude, longitude, elevation, bearing angle of the runway, as well as the approach course for the runway. Alternatively, the processing system 130 may receive the location and approach course of the runway via a data transmission received by communications system 140. The data transmission may be securely transmitted, for example, by the airport's tower or communication system. In another embodiment, the airport may orally communicate the location and approach course of the runway to a pilot and the pilot can enter the data into the EFVS 100 using the user input device 120.

After retrieving the location of the runway and the approach course, the processing system 130 may then cause a representation of the runway and the approach course for the runway to be displayed by display device 110. The representation of the runway may vary from image to image, depending, for example, upon the pitch of the aircraft and the distance of the aircraft from the runway. In other words, the representation of the runway appears to be conformal to a direct view from the current aircraft position and heading. The representation may be reflective of runway width, length, bearing directions. The representation can be displayed larger than the actual runway dimensions in order to account for uncertainties in aircraft navigational system performances or potential database inaccuracies. Accordingly, the processing system 130 may dynamically compute the location for the representation of the runway and the approach course for each frame in a video feed.

The processing system 130 may then define an area where approach runway signature for the runway may be present. The area where approach runway signature for the runway should be present may be stored in the database 170. Alternatively, the processing system 130 may receive the definition for the area via a data transmission received by communications system 140. In another embodiment, the processing system may define the area where approach runway signatures for the runway may be present based upon the retrieved location of the runway. For example, the processing system could define an area on the image or video feed, for example, a box, rectangle or any other appropriate shape, before a first end of the runway as the area where approach runway signatures for the runway may be present. For example, the size of area may be determined by the stored information of the leading in lights locations for the approaching runway.

The processing system 130 will then enhance, in real time, the defined area to assist the pilot in identifying the approach runway signature by, for example, performing image processing on the defined area, adjusting, for example, the brightness, contrast or other attribute of the defined area. In another embodiment, the processing system 130 may enhance the defined area by adjusting the exposure length for the defined area.

As discussed above, many airports have specific approach runway signatures. For example, many airports use a series of lights arranged in a "T" or cross pattern, where the vertical portion of the "T" or cross corresponds to the center of the runway. However, other approach runway signatures may be used. Accordingly, in another embodiment the processing system 130 may use image processing to identify the approach runway signature within the image or video feed and direct the pilots' attention to the identified approach runway signature. For example, the processing system may highlight the approach runway signature, for example, by adjusting the color or brightness of the lights corresponding to the approach runway signature on the display device 110. In another embodiment, the processing system 130 may perform additional image processing on the defined area to reduce extraneous noise so that the approach runway signature stands out more clearly.

The configuration of the approach runway signature for each runway may be stored in the database 170 or may be received by communications system 140. In one embodiment, the approach runway signature may be transmitted by the airport in data form, received by the communications system 140 and identified by the processing system 130. Alternatively, the airport may orally communicate the approach runway signature to a pilot and the pilot can enter the configuration of the approach runway signature to the EFVS 100 using the user input device 120.

Accordingly, as the aircraft descends to the respective decision height for the current conditions at the airport, the EFVS can direct the pilots' attention to the spot on the cockpit window where the approach runway signature should be, or will shortly become, visible. One benefit of the claimed embodiments, for example, is that the pilot may visually confirm sight of the approach runway signature more quickly, thereby allowing the decision to proceed with the landing to occur more quickly. Alternatively, if the pilot can not visually confirm the approach runway signature through the cockpit window despite the EFVS's assistance, the pilot can quickly make the decision to abort the landing. Another benefit of the claimed embodiments is that if the image displayed on the display device 110 does not match up with the actual view outside of the cockpit window, the pilot can quickly determine that there is an instrument malfunction and abort the landing.

In one embodiment, the EFVS 100 may turn off or the enhancement feature may be turned off when the aircraft descends below a certain altitude relative to the touchdown zone so that the pilot can not use the EFVS 100 to perform the actually landing and must visually identify the approach runway signature through the cockpit window.

The database 170 is suitably configured to support operations of the processing system 130, and may include, for example, a terrain database, an obstacle database, a navigational database, a geopolitical database, a terminal airspace database, a special use airspace database, or other information for rendering and/or displaying content on the display device 110. In an exemplary embodiment, the processing system 130 accesses a synthetic vision terrain database that includes positional (e.g., latitude and longitude), altitudinal, and other attribute information (e.g., terrain type information, such as water, land area, or the like) for the terrain, obstacles, and other features to support rendering a three-dimensional conformal synthetic perspective view of the terrain proximate the aircraft as described above.

In an exemplary embodiment, the processing system 130 is also coupled to a navigation system 160, which is configured to provide real-time navigational data and/or information regarding operation of the aircraft. The navigation system 160 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 160, as will be appreciated in the art. The navigation system 160 is capable of obtaining and/or determining the instantaneous position of the aircraft, that is, the current location of the aircraft (e.g., the current latitude and longitude) and the current altitude or above ground level for the aircraft. Additionally, in an exemplary embodiment, the navigation system 160 includes inertial reference sensors capable of obtaining or otherwise determining the attitude or orientation (e.g., the pitch, roll, and yaw, heading) of the aircraft relative to earth.

In the illustrated embodiment, the processing system 130 is also coupled to the communications system 140, which is configured to support communications to and/or from the aircraft. The communications system 140 is suitably configured to support communications between the aircraft and air traffic control or another suitable command center or ground location. In this regard, the communications system 140 may be realized using a radio communication system or another suitable data link system.

Figure 2:
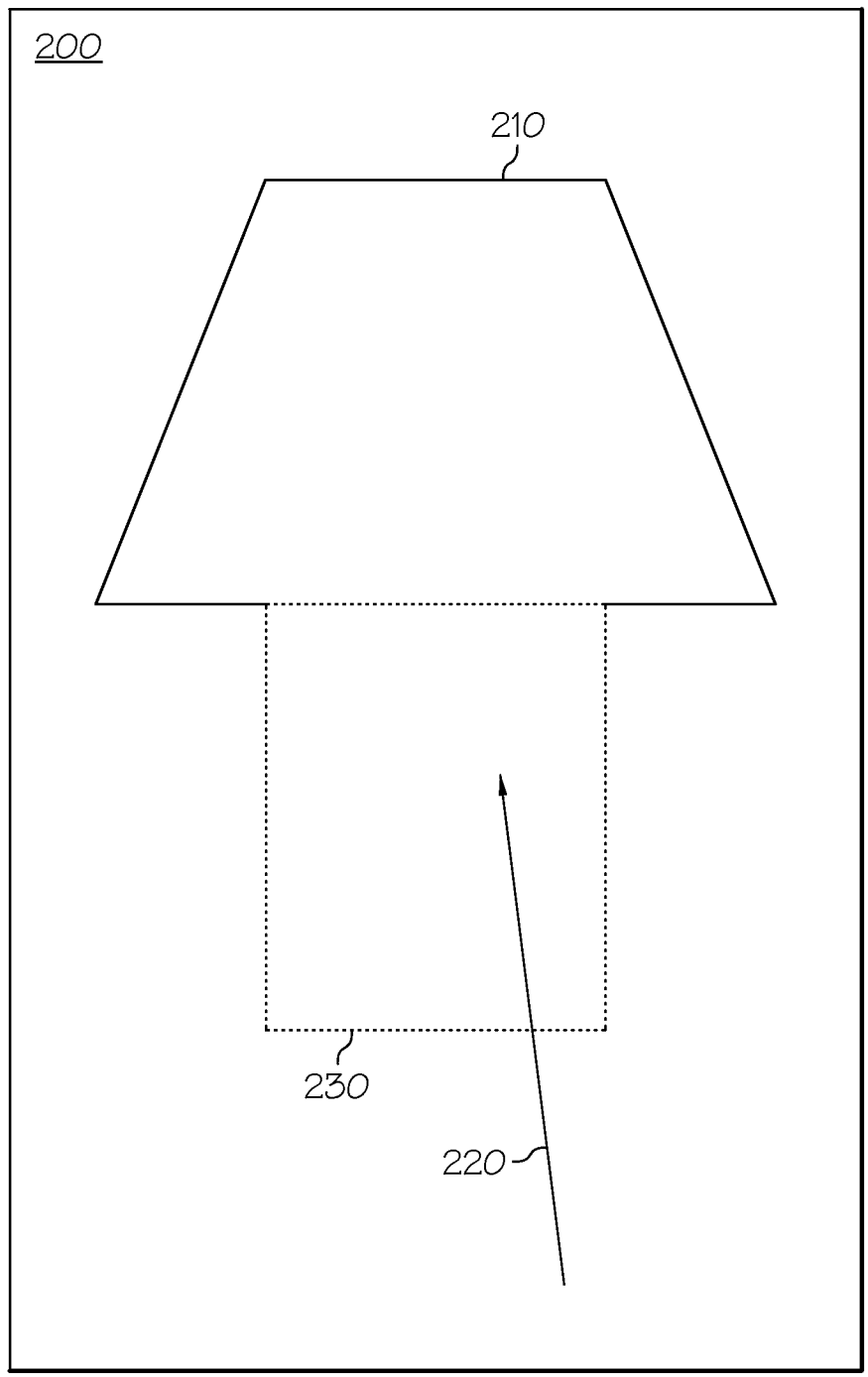
FIG. 2 illustrates an exemplary EFVS display in accordance with an embodiment.

FIG. 2 illustrates an exemplary display by the EFVS 200. As an aircraft approaches an airport, the EFVS 200 may access a database and retrieve the location of a runway, including the latitude, longitude and altitude, as well as an approach course 230. A representation of the runway 210 and the approach course 230 may then be displayed on a screen so that the pilot may get a visual indication of where the runway is in relation to the aircraft as well at the correct path to take to the specific runway. The representation of runway 210 may be wider than the actual runway to account for some navigational error.

As discussed above, the EFVS 200 may also define at least one area 220, based upon the location of the runway, to visually enhance. The defined area 220 should be large enough to include the location of approach runway signatures and any other useful features while accounting for some navigational error. Most approach signatures are quite close to the actual runway, however some variation can exist depending upon the airport. The appropriate size for each defined area 220 may be stored on a database on the aircraft. The larger the area 220 becomes, the more computational power required to enhance the image. Further, as the area 220 becomes larger, more noise will be present in the enhanced image which could distract the pilot. Accordingly, the EFVS 200 should define the area 220 to be as small as possible while accounting for some navigational error. If there are multiple features that a user needs to identify, multiple areas 220 can be defined or the area 220 may be enlarged to encompass all of the features.

Figure 3:
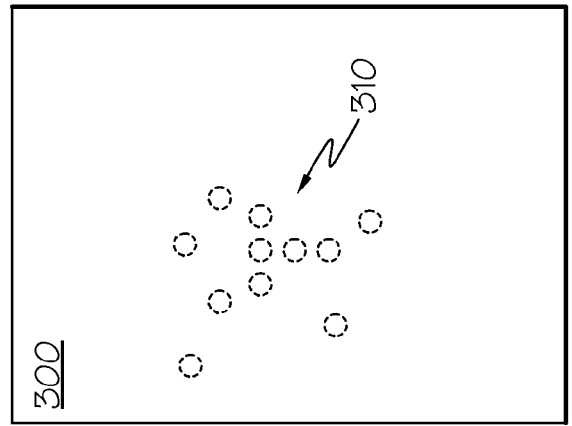
FIG. 3 illustrates an exemplary unenhanced defined area in accordance with an embodiment.

FIG. 3 illustrates an exemplary unenhanced area 300. Because of various weather conditions, such as rain, snow, clouds or areas of higher thermal signatures, the approach runway signature 310 may not be readily identifiable by the pilot through the cockpit window. Conditions such as smog, haze, dust storms and forest fires can also create conditions obscuring direct visual runway identification. Area 300 corresponds to an unenhanced image which could have been obtained by the imaging device 150 as discussed in reference to FIG. 1. As previously discussed, if the pilot cannot visually identify the approach runway signature before the aircraft descends to the decision level for the conditions at the airport, the pilot will have to abort the landing procedure.

Figure 4:
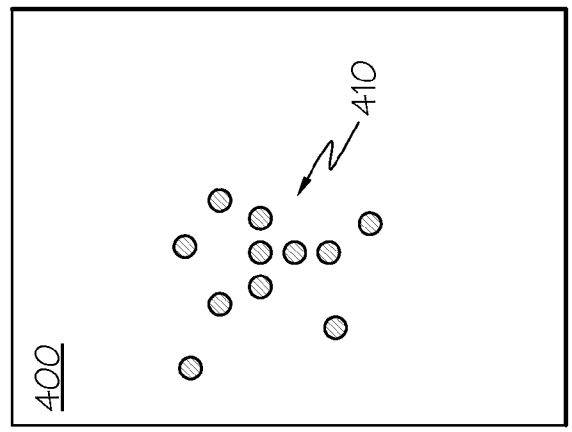
FIG. 4 illustrates an exemplary enhanced defined area in accordance with an embodiment.

FIG. 4 illustrates an exemplary enhanced area 400 in accordance with one embodiment of the present invention. As seen in FIG. 4, the area 400 has been enhanced relative to area 300 in FIG. 3, and, accordingly, the approach runway signature 410 may be easier for the pilot to identify.

As discussed above, the display, whether embodied on a head up display or a secondary display, may be configured such that the center of the display corresponds to the view from the center of the cockpit window. Accordingly, the pilot should know exactly where to look, out the cockpit window, for the approach runway signature.

Figure 5:
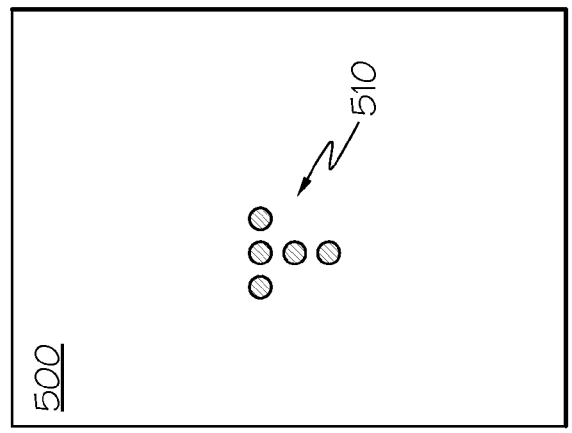
FIG. 5 illustrates an exemplary enhanced defined area, after noise suppression image processing, in accordance with an embodiment.

FIG. 5 illustrates another exemplary enhanced area 500 in accordance with another embodiment of the present invention. In this embodiment the enhanced area 500 has gone through further image processing which has identified the approach runway signature 510 and reduced the noise that had been present in the area, see e.g., area 400 of FIG. 4.

Figure 6:
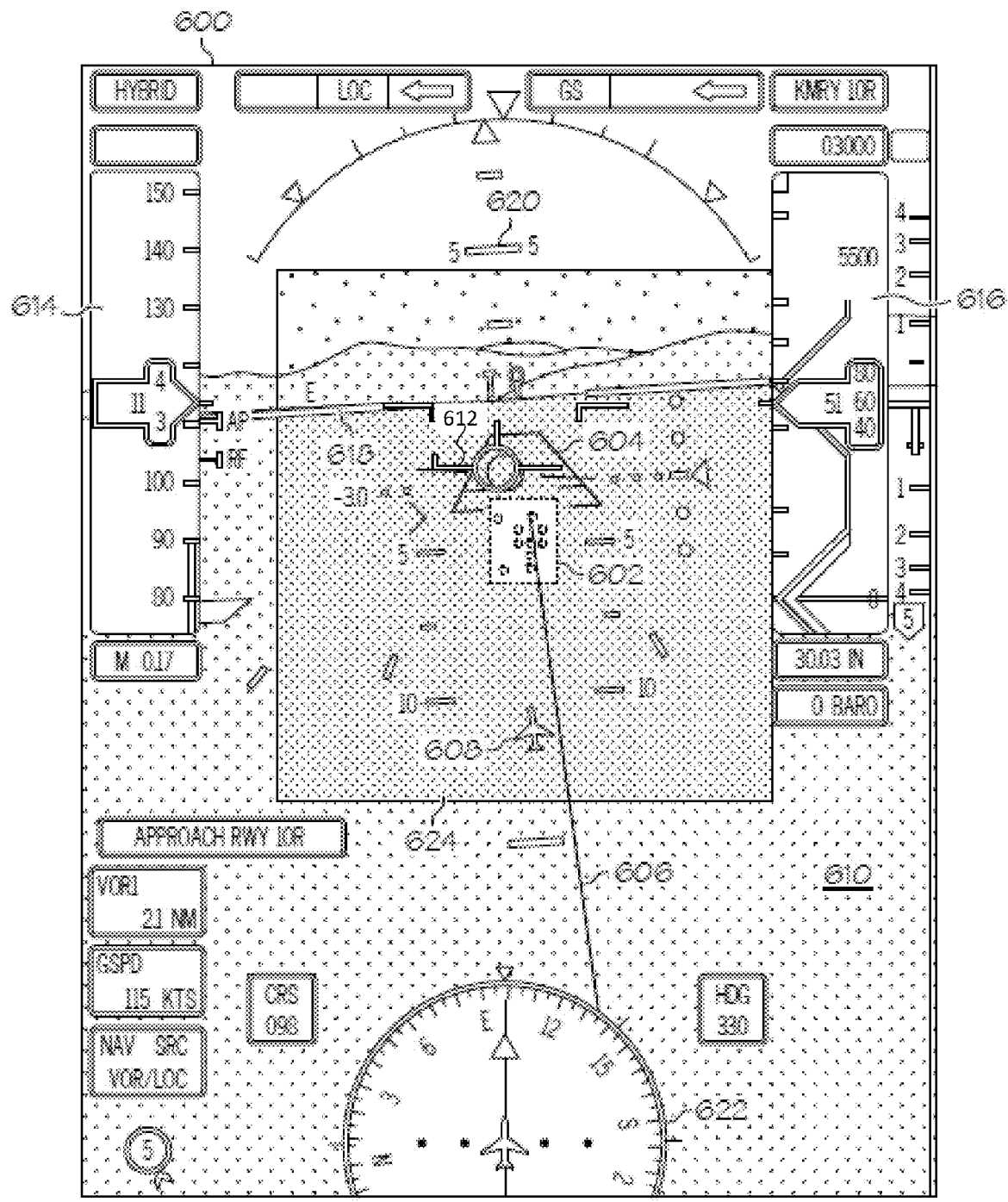
FIG. 6 illustrates another exemplary EFVS display in accordance with an embodiment.

FIG. 6 illustrates an exemplary view of the EFVS display 600 prior to a defined area 602 being enhanced. The EFVS display 600 may include a representation of an upcoming runway 604 and an approach course 606 for the upcoming runway. The EFVS may also display a representation of the aircraft 608 showing the location of the aircraft relative to the approach course 606. The EFVS display 600 may further provide, for example, several features to assist the pilot during flight, including a synthetic perspective view of terrain 610, a reference symbol 612 corresponding to the current flight path of the aircraft, an airspeed indicator 614 (or airspeed tape) that indicates the current airspeed of the aircraft, an altitude indicator 616 (or altimeter tape) that indicates the current altitude of the aircraft, a zero pitch reference line 618, a pitch ladder scale 620, and a compass 622. An image 624, captured by an imagining device, as previously described, may be overlaid on the synthetic perspective view of terrain 610. The synthetic perspective view of terrain 610 may be based upon data stored in a database, as previously described.

Figure 7:
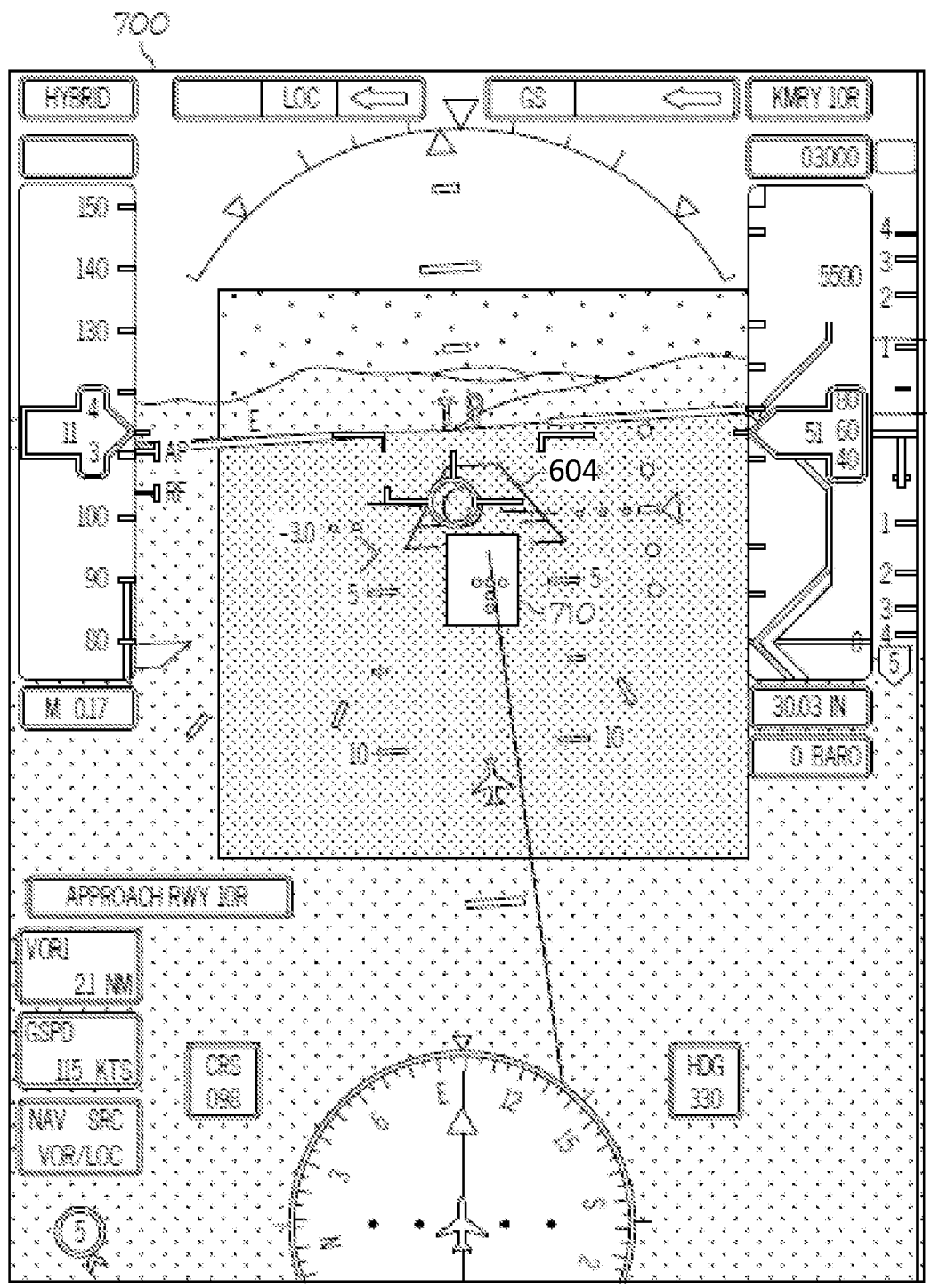
FIG. 7 illustrates yet another exemplary EFVS display in accordance with an embodiment.

FIG. 7 illustrates an exemplary view of an EFVS display 700 after the defined area 710 is enhanced. Features on FIG. 7 which were explained with respect to FIG. 6 are not referenced herein. As seen in FIG. 7, the area 710 before a first end of the runway 604 is enhanced giving the pilot a better idea of where the approach runway signatures will appear through the cockpit window.

Figure 8:
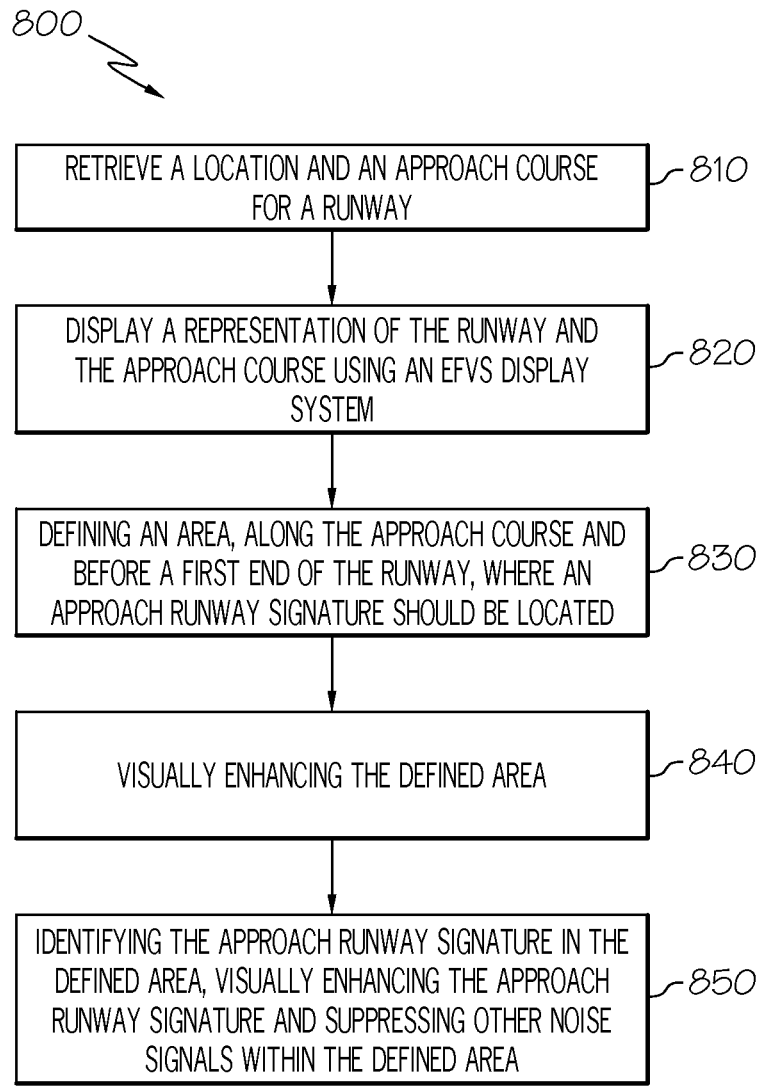
FIG. 8 illustrates a method for enhancing approach runway signatures in an EFVS system.

FIG. 8 a flow diagram illustrated an exemplary method or system process 800 for identifying and enhancing approach runway signatures in an EFVS system in accordance with one embodiment of the present invention. In a first step 810, the EFVS system retrieves a location of a runway and an approach course for the runway that an aircraft is approaching. The EFVS then, in step 820, may then display a representation of the runway and the approach course for the runway, relative to a current position of the aircraft, using the EFVS display system. The EFVS may then, in step 830, define an area, along the approach course and before a first end of the runway, where an approach runway signature should be located. Thereafter, the EFVS, in step 840, visually enhances the defined area in accordance with one of the previously discussed methods. In some embodiments, further image processing may occur. For example, the EFVS may, in step 850, identify the approach runway signature in the defined area, visually enhancing the approach runway signature and/or suppressing other noise signals within the defined area.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for visually enhancing an approach runway signature comprising a plurality of runway lights arranged in a predefined pattern on an enhanced flight vision system on an aircraft, comprising:
    retrieving a location and an approach course for a runway;
    displaying, on the enhanced flight vision system, a representation of the runway relative to a position of the aircraft;
    defining an area, along the approach course and before a first end of the runway, where the approach runway signature should be located;
    capturing, by an imaging device, an image of the defined area;
    displaying, on the enhanced flight vision system, the captured image relative to a position of the aircraft and at the first end of the representation of the runway displayed on the enhanced light vision system; and
    visually enhancing, on the enhanced flight vision system, the plurality of runway lights of the approach runway signature in the captured image, wherein the visually enhancing comprises suppressing noise not associated with the runway lights of the approach runway signature in the defined area.

2. The method of claim 1, further comprising:
    identifying the type of approach runway signature for the runway; and
    processing the defined area to locate the approach runway signature within the defined area.

3. The method of claim 1, the visually enhancing further comprising:
    adjusting a brightness and contrast of the defined area.

4. The method of claim 1, further comprising:
    enabling the display of the visually enhanced defined area when the aircraft descends to a predetermined altitude;
    ceasing the display of the visually enhanced defined area when the aircraft descends below a predetermined altitude threshold relative to an altitude of the runway.

5. An Enhanced Flight Vision System (EFVS) for an aircraft, comprising:

a database storing a location of a runway and an approach course for the runway;

a processor configured to define an area, along the approach course and before a first end of the runway, where an approach runway signature comprising a plurality of runway lights arranged in a predefined pattern should be located;

a display; and an imaging device to capture at least one image including the defined area, wherein the processor is further configured to:

display, on the display, the approach course for the runway and a representation of the runway relative to a current position of the aircraft, perform image processing on the at least one captured image including, enhancing the plurality of runway lights of the approach runway signature in the defined area within the at least one captured image and suppressing noise not associated with the runway lights of the approach runway signature in the defined area of the captured image, and display, on the display, the at least one captured image with the enhanced defined area on the display over the representation of the runway and relative to the current position of the aircraft.

6. The EFVS of claim 5, said image processing further comprising:

adjusting a brightness and contrast of the defined area within the at least one captured image.

7. The EFVS of claim 5, said processor further configured to identify the approach runway signature within the at least one captured image including the defined area.

8. The EFVS of claim 7, said processor further configured to highlight the identified approach runway signature on the display.

9. The EFVS of claim 7, wherein the database stores, for each stored runway location, corresponding approach runway signatures, and the processor used the stored corresponding approach runway signatures to identify the approach runway signature within the at least one captured image including the defined area.

10. The EFVS of claim 5, wherein the processor is further configured to stop displaying the at least one captured image with the enhanced defined area after the aircraft descends below a predetermined altitude threshold relative to an altitude of the runway.

11. The EFVS of claim 5, wherein the imaging device is an infrared camera and the processor performs the image processing in real time.

12. The EFVS of claim 5, wherein the imaging device is sonar based system and the processor performs the image processing in real time.

13. The EFVS of claim 5, wherein the display is a head up display.

14. The EFVS of claim 5, wherein the display is a secondary display in a cockpit of the aircraft.

15. A method for visually enhancing an approach runway signature comprising a plurality of runway lights in a predefined pattern on an enhanced flight vision system on an aircraft, comprising:

displaying, on the enhanced flight vision system, a synthetic perspective view of terrain in front of the aircraft;

capturing an image, using an infrared camera, of actual terrain in front of the aircraft;

overlaying, on the displayed synthetic perspective view, the captured image;

retrieving a location and an approach course for a runway;

overlaying, on the captured image, a representation of the runway and the approach course for the runway relative to a position of the aircraft;

defining an area, along the approach course and before a first end of the runway, where the approach runway signature should be located; and visually enhancing the plurality of runway lights of the approach runway signature within the defined area on the captured image, wherein the visually enhancing comprises suppressing noise not associated with the runway lights of the approach runway signature in the defined area in the defined area on the captured image.

16. The method of claim 15, further comprising:

identifying the type of approach runway signature for the runway; and processing the defined area to locate the approach runway signature within the defined area.

\* \* \* \* \*